UNITED STATES PATENT OFFICE 2,424,061

9-AMINO-ALKYL-AMINO-SUBSTITUTED ACRIDINE DERIVATIVES

Horace A. Shonle and Joseph W. Corse, Indianapolis, Ind., assignors to Eli Lilly and Company, Indianapolis, Ind., a corporation of Indiana No Drawing. Application June 29, 1944,
Serial No. 542,826

3 Claims. (Cl. 260—279)

This invention relates to certain new 2-methoxy-6-chloro-9-[α-methyl-ω-(unsymmetrical disubstituted amino)-polymethyleneamino] acridines, and their salts, having anti-malarial value; to certain new intermediates used in making them; and to the process of making these new compounds.

These new substituted acridines have the following general formula:

(1) 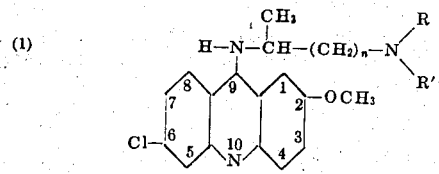

in which R and R' are different saturated tertiary (primary or secondary) hydrocarbon radicals, the sum of the carbon atoms in R and R' does not exceed 10, and $n$ is an integer between 1 and 4 inclusive.

Examples of hydrocarbon radicals which R and R' may represent are the following:

Methyl
Ethyl
n-Propyl and isopropyl
n-Butyl and its primary and secondary isomers
n-Amyl and its primary and secondary isomers
n-Hexyl and its primary and secondary isomers
n-Heptyl and its primary and secondary isomers
Cyclopropyl
Cyclobutyl
Cyclopentyl
Cyclohexyl
Cycloheptyl Our general process for preparing our substituted acridines is as follows:

1. We prepare, or obtain, a secondary amine of the following formula:

(2) 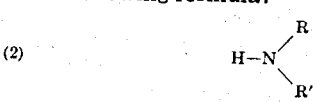

in which R and R' have the same significance as in Formula 1.

In some cases such substituted amines are known. In other cases, they are new, and are described and claimed in co-pending patent application of one of us (Shonle and Ewald Rohrmann. They may be prepared by reacting a primary amine containing one desired R or R' substituent with hydrogen and an aldehyde or ketone having the carbon skeleton of the other desired R or R' substituent, under pressure and in the presence of a catalyst such as Raney nickel, and by purifying the resulting secondary amine by known methods.

2. We convert this secondary amine to a ketone of the following formula:

(3) 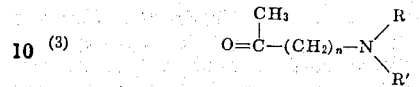

in which R and R' have the same significance as in Formula 1. These ketones are new with us. They may be prepared in a number of ways. When a suitable methyl-ω-chloroalkyl ketone is available, it may be condensed with the secondary amine, to produce the desired ketone of Formula 3. In some cases, it is convenient to first produce an ω-chloroalkyldisubstituted amine, and convert it to the desired ketone of Formula 3.

3. We convert the ketone of Formula 3 to a corresponding oxime of the following formula:

(4) 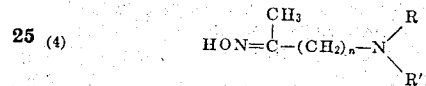

in which R, R', and $n$ have the same significance as in Formula 1. This may be prepared by heating the ketone of Formula 3 with hydroxylammonium chloride for several hours.

4. We reduce the oxime of Formula 4 to a diamine of the following formula:

(5) 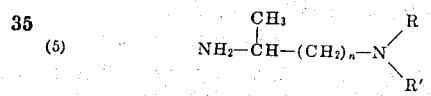

in which R, R', and $n$ have the same significance as in Formula 1. This reduction may be accomplished in any of a number of ways; for example, by treating an alcohol solution of the oxime with hydrogen under pressure and heat, or with metallic sodium.

5. We condense the diamine of Formula 5 with 2-methoxy-6,9-dichloroacridine, in phenol, to produce the desired 2-methoxy-6-chloro-9-[α-methyl-ω-(unsymmetrical disubstituted amino)-polymethyleneamino] acridine of Formula 1. This product is liberated, as with a solution of sodium hydroxide, and is recovered by extraction with ether. It may be converted to a salt; for example, treatment of the ether solution with hydrogen chloride gas produces the dihydrochloride as a precipitate.

The following are examples of our new products, and of the process of making them.

*Example 1.*—2-methoxy-6-chloro-9-[1'-methyl-4'-(methyl - n - butylamino)butylamino]acridine and its dihydrochloride.

Methyl-n-butylamine, used in this example, may be prepared as follows: A solution of 27 g. of methylamine and 63 g. of n-butyraldehyde is treated with hydrogen in the presence of Raney nickel catalyst, at about 100° C. and a pressure of about 1600 p. s. i. The reaction mixture is filtered, to remove the catalyst, and the fraction of the filtrate boiling at 86–89° C. is recovered by distillation. It is methyl-n-butylamine, which has the following formula:

(6) 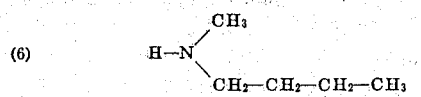

A mixture of 25 g. of methyl-n-butylamine and 30.1 g. of 1-chloro-4-pentanone is sealed in a tube and heated overnight at 150° C. This produces, in a yield of 18 g., 1-methyl-n-butylamino-4-pentanone, which boils at 81–83° C. at 5–6 mm. pressure, and which has the following formula:

(7) 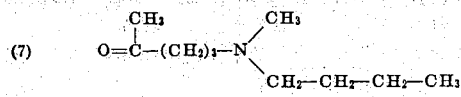

To a solution of 28.5 g. of hydroxylammonium chloride in 35 cc. of water is added 68.4 g. of 1-methyl-n-butylamino-4-pentanone. The mixture is heated on a steam bath for four hours, and an excess of solid potassium bicarbonate is then added. The reaction mixture is then extracted with ether, and the ether solution is vacuum distilled. The portion boiling at 158° C. at 13 mm. pressure is collected, in a yield of 54.5 g. It is 1 - methyl - n - butylamino - 4 - pentanoneoxime, which has the following formula:

(8) 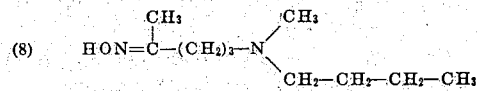

A solution of 54 g. of this 1-methyl-n-butylamino-4-pentanoneoxime in 50 cc. of alcohol is reduced with hydrogen in the presence of Raney nickel catalyst at 95° C. and at 1150 p. s. i. The reaction mixture is filtered, to remove the catalyst, and the filtrate is distilled. The portion boiling at 216–220° C. is collected, in a yield of 28 g. It is 1-methyl-4-(methyl-n-butylamino) butylamine, which has the following formula:

(9) 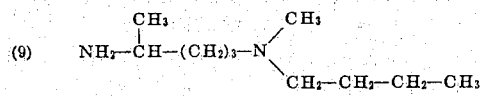

A mixture of 18 g. of this diamine of Formula 9, 12.5 g. of 2-methoxy-6,9-dichloroacridine, and 55 cc. of phenol is heated and stirred on a steam bath for two hours. The reaction mixture is made alkaline with a dilute aqueous solution of sodium hydroxide. This liberates as an oily free base the desired 2-methoxy-6-chloro-9-[1'-methyl-4'-(methyl - n - butylamino)butylamino] acridine, which has the following formula:

(10) 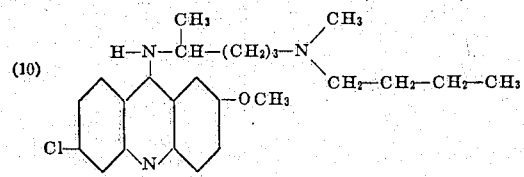

This is extracted with ether. It may be purified as follows: The ether solution is washed with water and extracted with dilute acetic acid, the acetic acid solution is made basic with ammonium hydroxide, and the resulting mixture is extracted with ether. The desired substituted acridine may be recovered by distillation of the ether solution.

To convert the substituted acridine to its dihydrochloride, an ether solution containing it is treated with hydrogen chloride, as by passing hydrogen chloride gas through such solution. This causes precipitation of the desired dihydrochloride of 2-methoxy-6-chloro-9-[1'-methyl-4'-(methyl - n - butylamino)butylamino]acridine, in the form of crystals which melt at 160–162° C.

*Example 2.*—2-methoxy-6-chloro-9-[1'-methyl-4'-(n-propylisopropylamino)butylamino]acridine, and its dihydrochloride.

n-Propylisopropylamine may be prepared, and condensed with 1-bromo-4-pentanone, by the procedure of Example 1, to produce 1-n-propylisopropylamino-4-pentanone, which boils at 74–77° C. at 4–5 mm. pressure, and which has the following formula:

(11)   $O=\overset{CH_3}{\underset{}{C}}-(CH_2)_3-N\begin{matrix}CH_2-CH_2-CH_3\\ \\ CH-CH_3\\ |\\ CH_3\end{matrix}$ To a cooled solution of 14 g. of hydroxylammonium chloride in 30 cc. of water is added 37.8 g. of 1-n-propylisopropylamino-4-pentanone. Then, 10.6 g. of anhydrous sodium carbonate is added, and the mixture is heated on a steam bath for three and one-half hours. The reaction mixture is cooled, and extracted with ether. The ether solution is vacuum distilled, and the fraction boiling at 150–155° C. at 30 mm. pressure is collected, in a yield of 34 g. It is 1-n-propylisopropylamino-4-pentanoneoxime.

30 g. of this oxime is dissolved in 450 cc. of hot absolute alcohol, and 45 g. of metallic sodium is slowly added. The fraction of the reaction mixture boiling at 118–120° C. at 33 mm. pressure is recovered by vacuum distillation, in a yield of 9.5 g. It is 1-methyl-4-(n-propylisopropylamino)butylamine, which has the following formula:

(12)   $NH_2-\overset{CH_3}{\underset{}{C}H}-(CH_2)_3-N\begin{matrix}CH_2-CH_2-CH_3\\ \\ CH-CH_3\\ |\\ CH_3\end{matrix}$ A mixture of 6.2 g. of this diamine, 9 g. of 2-methoxy-6,9-dichloroacridine, and 40 cc. of phenol is heated on a steam bath and stirred for two hours. The reaction mixture is made alkaline with a dilute sodium hydroxide solution, which liberates as a free base the desired 2-methoxy-6-chloro-9-[1'-methyl-4'-(n-propylisopropylamino)butylamino]acridine, which has the following formula:

(13)

This is extracted with ether, and converted to its dihydrochloride, as in Example 1. The dihydrochloride melts at 165–168° C.

*Example 3.*—2-methoxy-6-chloro-9-[1'-methyl-

4'-(methylethylamino)butylamino]acridine, and its dihydrochloride.

Methylethylamine may be prepared, and condensed with 1-chloro-4-pentanone, by the procedure of Example 1, to produce 1-methylethylamino-4-pentanone, which boils at 64°–67° C. at 9 mm. pressure. From this, by the procedure of Example 2, the following compounds are successively prepared:

a. 1-methylethylamino-4-pentanoneoxime, which boils at 100–102° C. at 2 mm. pressure.
b. 1-methyl - 4 - (methylethylamino)butylamine, which boils at 176–180° C.
c. 2-methoxy-6-chloro-9-[1'-methyl-4'-(methylethylamino)butylamino]acridine, which has the following formula:

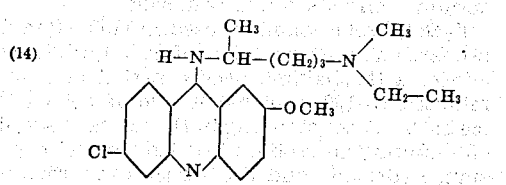

(14)

d. The dihydrochloride of this substituted acridine, which melts at 249–251° C.

*Example 4.*—2 - methoxy-6-chloro-9-[1'-methyl - 4'- (methyl-n-propylamino)butylamino]acridine, and its dihydrochloride.

Methyl-n-propylamine, which is known, is condensed with 1-chloro-4-pentanone, by the initial procedure of Example 1, to produce 1-methyl-n-propylamino-4-pentanone, which boils at 81–83° C. at 6 mm. pressure. From this, by the subsequent procedure of Example 1, the following compounds are prepared:

a. 1-methyl-n-propylamino - 4 - pentanoneoxime, which boils at 148° C. at 15 mm. pressure.
b. 1-methyl - 4 - (methyl-n-propylamino)butylamine, which boils at 200–208° C.
c. 2-methoxy-6-chloro-9-[1'-methyl-4'-(methyl-n - propylamino)butylamino]acridine, which has the following formula:

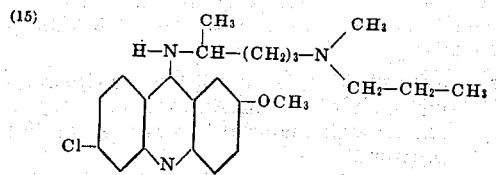

(15)

d. The dihydrochloride of this substituted acridine, which melts at 179–181° C.

*Example 5.*— 2 - methoxy - 6 - chloro - 9 - [1'-methyl-4'-(ethyl - n - propylamino)butylamino] acridine, and its dihydrochloride.

Ethyl-n-propylamine, which is known, is condensed with 1-chloro-4-pentanone by the initial procedure of Example 1, to produce 1-ethyl-n-propylamino-4-pentanone, which boils at 64–67° C. at 4 mm. pressure. From this, by the subsequent procedure of Example 1, the following compounds are prepared:

a. 1 - ethyl-n-propylamino - 4 - pentanoneoxime, which boils at 161–163° C. at 32 mm. pressure.
b. 1 - methyl - 4 -(ethyl - n - propylamino)butylamine, which boils at 115–118° C. at 37 mm. pressure.

c. 2-methoxy-6-chloro - 9 -[1'-methyl-4'-(ethyl-n-propylamino)butylamino] acridine, which has the following formula:

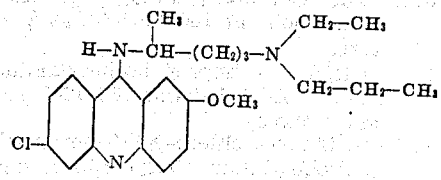

(16)

d. The dihydrochloride of this substituted acridine, which melts at 162–165° C.

*Example 6.*—2 - methoxy - 6 - chloro - 9 - [1'-methyl - 4' - (ethylisopropylamino) butylamino] acridine, and its dihydrochloride.

Ethylisopropylamine, which is known, is condensed with 1-chloro-4-pentanone, by the procedure of Example 1, to produce crude 1-ethylisopropylamino-4-pentanone. From this ketone, by the subsequent procedure of Example 1, the following compounds are successively prepared:

a. 1-ethylisopropylamino-4-pentanoneoxime.
b. 1-methyl-4-(ethylisopropylamino) butylamine.
c. 2 - methoxy-6-chloro-9-[1'-methyl-4'-(ethylisopropylamino)butylamino]acridine, which has the following formula:

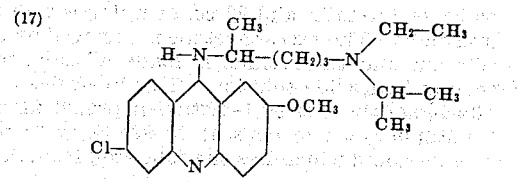

(17)

d. The dihydrochloride of this substituted acridine of Formula 17, which melts at 160–162° C.

*Example 7.*—2 - methoxy - 6 - chloro - 9 -[1'-methyl-4'-(ethyl - n - butylamino)butylamino]-acridine, and its dihydrochloride.

Ethyl-n-butylamine may be prepared, and condensed with 1-bromo-4-pentanone, by the initial procedure of Example 1, to produce 1-ethyl-n-butylamino-4-pentanone, which boils at 83–85° C. at 3 mm. pressure. From this, by the subsequent procedure of Example 1, the following are prepared:

a. 1-ethyl - n - butylamino - 4 - pentanoneoxime, which boils at 110–113° C. at 2 mm. pressure.
b. 1-methyl - 4-(ethyl-n-butylamino) butylamine, which boils at 118–121° C. at 27–28 mm. pressure.
c. 2-methoxy-6-chloro-9-[1'-methyl - 4'-(ethyl-n - butylamino) butylamino]acridine, which has the following formula:

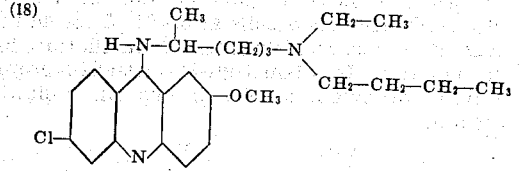

(18)

d. The dihydrochloride of this substituted acridine, which melts at 182–183° C.

*Example 8.*—2 - methoxy - 6 - chloro - 9 - [1'-methyl - 4'-(isopropylisobutylamino) butylamino] acridine, and its dihydrochloride.

Isopropylisobutylamino may be prepared, and condensed with 1-bromo-4-pentanone, by the initial procedure of Example 1, to produce 1-isopropylisobutylamino-4-pentanone, which boils at 97° C. at 2 mm. pressure. From it, by the subsequent procedure of Example 1, the following are prepared:

a. 1 - isopropylisobutylamino-4-pentanone oxime, which boils at 106–110° C., at 2 mm. pressure.
b. 1-methyl - 4 - (isopropylisobutylamino) butylamine, which boils at 112–120° C., at 18–22 mm. pressure.
c. 2 - methoxy-6-chloro-9-[1'-methyl-4'-(isopropylisobutylamino)butylamino]a c r i d i n e, which has the following formula:

(19) 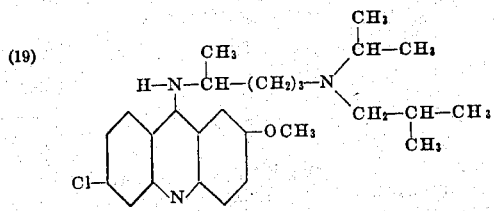

d. The dihydrochloride of this substituted acridine, which melts at 161–163° C.

Example 9.—2 - methoxy - 6 - chloro - 9 - [1'-methyl - 3' - (methyl - n - propylamino)propylamino]acridine, and its dihydrochloride.

A mixture of 145 g. of acetone, 55 g. of methyl-n-propylamine hydrochloride (which is known), 45 cc. of formalin and 80 cc. of water is refluxed overnight. The excess acetone is removed by distillation and the residue is made alkaline with sodium hydroxide solution. This liberates as an oil 55 g. of the desired 1-methyl-n-propyl-amino-3-butanone, which boils at 90–92° C. at 35 mm. pressure, and which has the following formula:

(20) 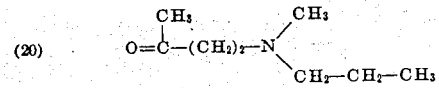

42.9 grams of 1-methyl-n-propylamino-3-butanone is added to a solution of 24.9 g. of hydroxylammonium chloride in 45 cc. of water. Then 20.1 g. of sodium carbonate is added, and the mixture is heated on a steam bath for four hours. The reaction mixture is extracted with ether, and the ether solution is vacuum distilled. The portion boiling at 141–144° C. is collected, in a yield of 37.5 g. It is 1-methyl-n-propylamino-3-butanoneoxime, which has the following formula:

(21) 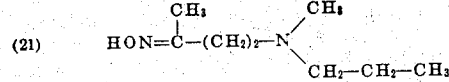

A solution of 20 g. of this oxime in 30 cc. of alcohol is treated with hydrogen in the presence of Raney nickel catalyst at 80–85° C. and at a pressure of 1000 p. s. i. The reaction mixture is filtered, to remove the catalyst, and the fraction of the filtrate which boils at 88–91° C. at 44 mm. pressure is recovered by vacuum distillation, in a yield of 16 g. It is 1-methyl-3-(methyl-n-propylamino) propylamine, which has the following formula:

(22) 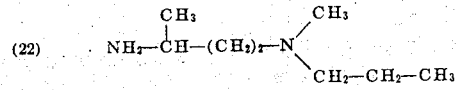

A mixture of 7.2 g. of 1-methyl-3-(methyl-n-propylamino)propylamine, 14 g. of 2-methoxy-6,9-dichloroacridine, and 50 cc. of phenol is heated and stirred on a steam bath for three hours. The reaction mixture is made alkaline with a dilute solution of sodium hydroxide, which liberates as a free base the desired 2-methoxy-6-chloro - 9 - [1'-methyl-3'-(methyl-n-propylamino)propylamino]acridine, which has the following formula:

(23) 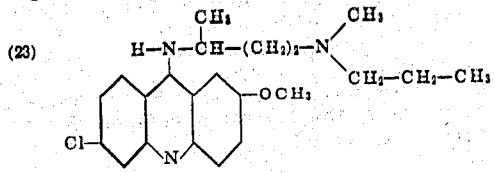

This is recovered by extraction with ether; and is converted into its dihydrochloride by treating the ether solution with hydrogen chloride, as in Example 1. The dihydrochloride melts at 170–173° C.

Example 10.—2 - methoxy - 6 - chloro - 9 - [1'-methyl-3'-(n-butylisobutylamino) propylamino]-acridine, and its dihydrochloride.

n-Butylisobutylamine, used in this example, is prepared as follows: 130 g. of isobutyraldehyde is added, with shaking, over a period of about 20 minutes, to 130 g. of n-butylamine cooled in an ice bath. After standing in the ice bath for about 45 minutes the product is dried first with potassium hydroxide and then with anhydrous magnesium sulfate. The drying agent is removed, and the crude residual product is distilled, to obtain a colorless liquid which boils at 135–139° C.

This colorless liquid is placed in a bomb together with about 12–15 g. of Raney nickel as a catalyst. The mixture is subjected to a hydrogen pressure of about 1500 pounds per square inch at a temperature of 130–140° C. until hydrogen is no longer absorbed; which reduction step requires about 3 to 4 hours. The catalyst is then removed, as by filtration. The filtrate is subjected to fractional distillation in a suitable fractionating column, and the material boiling at 145–148° C. is collected. This consists of a colorless liquid with an amine-like odor, and is the desired n-butyl-isobutylamine. The hydrochloride of this amine is made by adding the amine to an excess of hydrochloric acid and evaporating to dryness.

By the procedure of Example 9, this n-butylisobutylamine hydrochloride is used to prepare 1-n-butylisobutylamino-3-pentanone, which boils at 112–114° C. at 17 mm. pressure, and this latter is used to successively prepare the following compounds:

a. 1-n-butylisobutylamino-3-butanoneoxime.
b. 1-methyl-3 - (n - butylisobutylamino)propylamine, which boils at 120–122° C., at 29 mm. pressure.
c. 2-methoxy-6-chloro-9-[1'-methyl-3' - (n-butylisobutylamino ) propylamino ] acridine, which has the following formula:

(24) 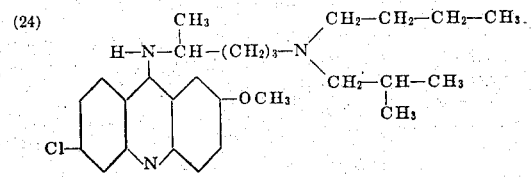

d. The dihydrochloride of the substituted acridine, which melts at 164–167° C.

Example 11.—2-methoxy-6 - chloro - 9 - [1'-methyl - 5' - (isobutyl-sec.-butylamino)pentylamino]acridine, and its dihydrochloride.

A mixture of 60 g. of isobutylamine, 75 g. of methylethyl ketone, and 12 g. of Raney nickel catalyst is subjected to hydrogen at a pressure of 1500 p. s. i., at a temperature of 150–160° C. for 2 hours. The catalyst is removed, as by filtration, and the fraction of the filtrate boiling at 136–138° C. is recovered by distillation. It is isobutyl-sec.-butylamine, which has the following formula:

(25) 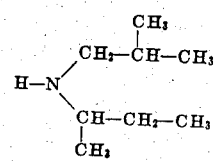

A mixture of 44 g. of this amine and 16 g. of trimethylene chlorohydrin (or 1-chloropropanol-3) is heated at 130° C. for 3 days. The reaction mixture (a crystalline paste) is shaken with about 30 cc. of 10% sodium hydroxide solution. The resulting mixture is extracted with ether; the ether solution is dried over anhydrous magnesium sulfate, and is then vacuum distilled. The fraction boiling at 97–99° C. at 7–8 mm. pressure is collected. It consists essentially of 3-(isobutyl-sec.-butylamino)propanol-1.

A solution of 13 g. of this aminoalcohol in 30 cc. of chloroform is slowly added to a solution of 17 g. of thionyl chloride in 90 cc. of dry chloroform, cooled to —5° C. The solution is allowed to stand at room temperature for 2 days, and the chloroform is then removed, as by evaporation on a steam bath under vacuum. The residue, a syrup, is twice subjected to evaporation under vacuum with 50 cc. of ethanol. It is then made alkaline with 10% sodium hydroxide solution, and extracted with ether. The ether solution is dried, as with anhydrous potassium carbonate, and distilled. The fraction boiling at 100–101° C. at 10 mm. pressure is collected, as a colorless liquid. It consists essentially of 3-(isobutyl-sec.-butylamino)propylchloride-1, which has the following formula:

(26) 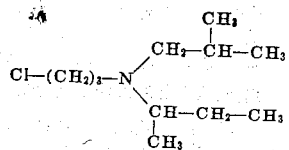

To a solution of 2.3 g. of sodium in 50 cc. of absolute alcohol, 13 g. of ethylacetoacetate is added, and the mixture is cooled. A solution of 10 g. of 3-(isobutyl-sec.-butylamino)propylchloride-1 in 10 cc. of alcohol is then added. The mixture is stirred and warmed at 50° C. for four hours, allowed to stand overnight, and heated again at 50° C. for three hours. The alcohol is then removed under vacuum, and water is added to the residue. An oil separates, which is recovered and heated on a steam bath with 500 cc. of 10% sulfuric acid for 10 hours. The resulting solution is cooled and neutralized with potassium carbonate. This liberates an oil, which is 1-(isobutyl-sec.-butylamino)-5-hexanone, which has the following formula:

(27) 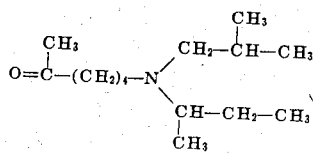

This oil is recovered by extraction with ether; and the ether solution is dried with magnesium sulfate and then filtered. The ether is removed by distillation, and the residual ketone is added to a solution of 2.1 g. of hydroxyl-ammonium chloride in 10 cc. of water. Then 1.6 g. of sodium carbonate is added, and the mixture is heated on a steam bath for two hours. A thick oil separates, which is 1-(isobutyl-sec.-butylamino)-5-hexanonoxime. This is recovered, dissolved in 10 cc. of ethanol, and reduced with hydrogen at 100° C. and at 1000 p. s. i. This produces 1-methyl-5-(isobutyl-sec.-butylamino)pentylamine, which has the following formula:

(28) 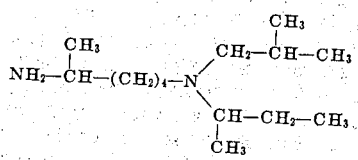

By the procedure of Example 1, this diamine is recovered from the reaction mixture by filtration and distillation, and is condensed with 2-methoxy-6,9-dichloroacridine, to produce 2-methoxy-6-chloro-9-[1'-methyl-5'-(isobutyl-sec.-butylamino)pentylamino]acridine which has the following formula:

(29) 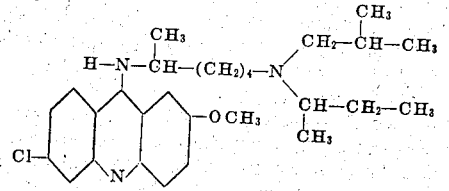

This substituted acridine is converted to its dihydrochloride, by the procedure of Example 1.

*Example 12.*—2-methoxy-6-chloro-9-[1'-methyl-2'-(n-butylisobutylamino)ethylamino]acridine and its dihydrochloride.

To 80 g. of cold n-butylisobutylamine (prepared as in Example 10), 30 g. of chloroacetone is added. The mixture is allowed to stand for two days, then warmed on a steam bath for one hour, cooled, and dissolved in dilute hydrochloric acid. The acid solution is evaporated to dryness, and an excess of sodium hydroxide solution is added to the residue. An oil is formed, and is separated. It is 1-n-butylisobutyl-amino-2-propanone.

By the procedure of Example 2, this ketone is used to successively prepare the following compounds:

a. 1-n-butylisobutylamino-2-propanonoxime;
b. 1-methyl-2-(n-butylisobutylamino)ethylamine;
c. 2-methoxy-6-chloro-9-[1'-methyl-2'-(n-butyl isobutylamino)ethylamino]acridine, which has the following formula:

(30) 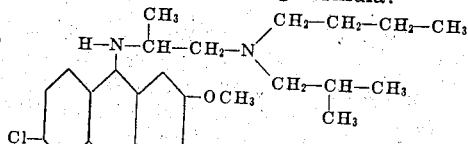

d. The dihydrochloride of this substituted acridine.

*Example 13.*—Example 1 may be repeated, save that instead of starting with ethylisopropylamine, we may use other disubstituted amines, of Formula 2, to produce corresponding 1-disubstituted amino-4-pentanones and oximes, 1-methyl-4-(disubstituted amino)butylamines, and 2-methoxy-6-chloro-9-[1'-methyl-4'-(disubstituted amino)butylamino]acridines and their dihydrochlorides.

*Example 14.*—Example 9 may be repeated, save that instead of using methyl-n-propylamine hydrochloride, we may use the hydrochloride of other disubstituted amines, of Formula 2, to produce corresponding 1-disubstituted amino-3-butanones and oximes, 1-methyl-3-(disubstituted amino)propylamines, and 2-methoxy-6-chloro-9-[1'methyl-3'-(disubstituted amino) propyl-amino]acridines and their dihydrochlorides.

Example 15.—Example 11 may be repeated, save that instead of using iso-butyl-sec.-butylamine, we may use other disubstituted amines, of Formula 2, to produce corresponding 1-disubstituted amino-5-hexanones and oximes, 1-methyl-5-(disubstituted amino)pentylamines, and 2-methoxy-6-chloro-9-[1'-methyl-5'-(disubstituted amino)pentylamino]acridines and their dihydrochlorides.

Example 16.—Example 12 may be repeated, save that instead of using n-butyl-isobutylamine, we may use other disubstituted amines, of Formula 2, to produce correspondingly 1-disubstituted amino-2-propanones and oximes, 1-methyl-2'-(disubstituted amino)ethylamines, and 2-methoxy-6-chloro-9-[1'-methyl-2'-(disubstituted amino)ethylamino]acridines and their dihydrochlorides.

Example 17.—Any of the preceding examples may be repeated, save that instead of converting the final substituted acridine to its dihydrochloride, we may form the dihydrobromide or other salts thereof, such for instance as the sulfate, the nitrate, the phosphate, the lactate, the propionate, etc.

Substituted acridines of the type shown in Formula 1 above, produced by the procedures of the foregoing examples, have antimalarial value, either directly or in the form of salts of various acids.

We claim as our invention:

1. The new substituted acridines having the following general formula:

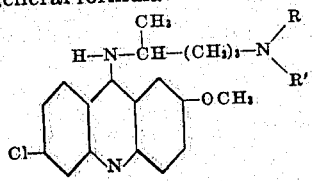

in which R is a radical of the class consisting of —CH₃ and —C₂H₅, R' is —C₂H₅ when R is —CH₃ and is —C₄H₉ when R is —C₂H₅, and their salts.

2. 2-methoxy-6-chloro-9-[1'-methyl-4'-(methylethylamino)butylamino]-acridine having the following formula:

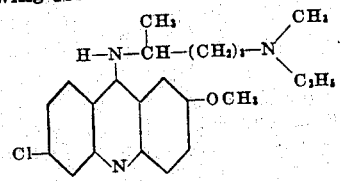

and its salts.

3. 2-methoxy-6-chloro-9-[1'-methyl-4'-(ethyl-n-butylamino)-butylamino]-acridine having the following formula:

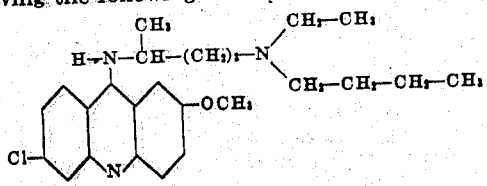

and its salts.

HORACE A. SHONLE.
JOSEPH W. CORSE.

REFERENCES CITED

The following references are of record in the file of this patent:

UNITED STATES PATENTS

| Number    | Name           | Date          |
|-----------|----------------|---------------|
| 2,082,171 | Mietzsch et al.| June 1, 1937  |
| 2,113,357 | Mietzsch et al.| Apr. 5, 1938  |
| 2,121,207 | Mietzsch et al.| June 21, 1938 |
| 2,160,058 | Cover          | May 30, 1939  |
| 2,276,149 | Bock           | Mar. 10, 1942 |

OTHER REFERENCES

Burckhalter et al., Jour. Amer. Chem. Soc., vol. 65, pp. 2012-2015 (Oct. 1943).

Fourneau et al., Ann. Inst. Pasteur, vol. 65, pp. 514-541 (1931).

Magidson et al., Jour. Gen. Chem. (U. S. S. R.), vol. 8, pp. 56-66 (1938).

Certificate of Correction

July 15, 1947.

Patent No. 2,424,061.

HORACE A. SHONLE ET AL.

It is hereby certified that errors appear in the printed specification of the above numbered patent requiring correction as follows: Column 1, line 52, for the syllable "plication" read *plications*; and same line, after "Shonle" insert a closing parenthesis; column 4, line 32, for "37.8" read *27.8*; column 6, line 71, for "isopropylisobutylamino" read *isopropylisobutylamine*; column 8, line 59, for that portion of the formula reading "(CH₂)₃" read (CH₂)₂; and that the said Letters Patent should be read with these corrections therein that the same may conform to the record of the case in the Patent Office.

Signed and sealed this 2nd day of September, A. D. 1947.

[SEAL]

LESLIE FRAZER,
*First Assistant Commissioner of Patents.*